US005805440A

United States Patent [19]

Maeshima et al.

[11] Patent Number: 5,805,440

[45] Date of Patent: Sep. 8, 1998

[54] POWER SUPPLY UNIT FOR ELECTRONIC DEVICE

[75] Inventors: Yoshihiro Maeshima; Naofumi Imai, both of Suwa-gun, Japan

[73] Assignee: Chinon Kabushiki Kaisha, Nagano, Japan

[21] Appl. No.: 721,611

[22] Filed: Sep. 26, 1996

[30] Foreign Application Priority Data

Feb. 20, 1996 [JP] Japan .................................... 8-032008

[51] Int. Cl.[6] .................................................. H02M 1/00

[52] U.S. Cl. ........................................................... 363/146

[58] Field of Search ............................ 363/146; 396/190; 362/3; 439/76.1, 172, 310

[56] References Cited

U.S. PATENT DOCUMENTS 4,025,933 5/1977 Berg ........................................ 396/190
4,959,021 9/1990 Byre ........................................ 439/310
5,540,596 7/1996 Bothe et al. ........................... 439/76.1

*Primary Examiner*—Adolf Berhane
*Attorney, Agent, or Firm*—Morrison Law Firm

[57] ABSTRACT

A power supply unit for an electronic device includes a power plug and an interconnection between the poser plug and the device. A power plug for an AC-DC adapter fits into a battery compartment of an electronic device instead of into a separate jack. The power supply unit includes an elastic cover that ensures a positive connection between the device and the power plug to prevent accidental disengagement of the power plug from the device. The power plug and battery compartment are configured so that an incorrect power plug cannot be connected by mistake. The configuration preferably includes a switch to signal the device that an AC-DC adapter is installed.

9 Claims, 9 Drawing Sheets

POWER SUPPLY UNIT FOR ELECTRONIC DEVICE

BACKGROUND OF THE INVENTION

The present invention relates to an power supply unit for an electronic device, and in particular, to a power plug—device interconnection for an electronic device that alternatively runs on battery power.

A small electronic device, such as an electronic camera, CD player, tape recorder, or the like, is often used both outdoors and indoors. For this reason, such devices are usually capable of using commercial AC power via an AC-DC adapter when used indoors and battery power when used outdoors.

Referring to FIGS. 10 and 11, a battery compartment (not shown) for containing a battery 12 is formed at a side portion of a body of an electronic camera 11. A jack 15 for receiving a power plug 14 of an AC-DC power adapter (not shown) is adjacent the battery compartment. Power plug 14 is usually used indoors to prevent using up battery 12. Electronic camera 11 also has a jack 17 for receiving a communication plug 16 to communicate with peripheral equipment.

However, providing jacks 15 and 17 in addition to the battery compartment requires considerable space in the body of a compact device such as electronic camera 11. The requirement for two jacks and a battery compartment is disadvantageous in view of reducing the size and cost of a camera.

Since jack 15 and power plug 14 of the AC-DC adapter are usually of standardized commercial products that are widely available, a plug of an AC-DC adapter intended for a different device is sometimes mistakenly inserted into jack 15. Should the other device be designed for a higher voltage, there is the danger of camera 11 incurring damage. Some communication plugs 16 can be inserted into jack 15 by mistake, damaging sensitive communication equipment.

Examples of a configuration to omit the power plug jack for the power plug of an AC-DC adapter are offered in Japanese Patent Laid-open Nos. 139882/1990 and 92381/1992, wherein a power plug of an AC-DC adapter is formed in such a shape as to permit it to be contained in the battery compartment.

Neither configuration offered in Japanese Patent Laid-open No. 139882/1990 nor No. 92381/1992, however, specifically provides a means to prevent the adapter power plug from being disengaged from the battery compartment since the connection depends on friction alone. Typical means for preventing such a disengagement is to provide the power plug and the battery compartment with two fastening members that engage each other, such as, for example, a hook and a ring, in the same manner as the connection of a printer cable to a printer. Such a configuration, however, increases the number of parts required and inconvenience since the fastening members have to be hooked and unhooked whenever the plug is used.

The aforementioned battery-shaped adapter plug can be used for various devices which use batteries of the same type. This universality, however, presents an additional problem. It is often necessary in a camera or other precision electronic device to use a special adapter with particular specifications corresponding to the characteristics of each device. Automatic focusing and winding cameras use more powerful batteries than cameras that only have an automatic light meter. CD and tape recorder/players also have differing power requirements. Due to the standardized shape of the battery-shaped power plug of the prior art, there is the danger that an adapter having the wrong specifications is connected to the wrong equipment by mistake.

Furthermore, in cases where the battery-shaped power plug has a cylindrical shape, corresponding to the shape of most batteries, the plug can be installed wrong. In order to prevent misinstallation, a special configuration, such as providing the plug and the battery compartment with corresponding indentations and protrusions, is necessary.

OBJECTS AND SUMMARY OF THE INVENTION

An object of the present invention is to provide a power plug for an electronic device which eliminates the need for a separate jack.

Another object of the present invention is to provide a power plug for an electronic device which makes positive connection with the device to prevent accidental disengagement.

Another object of the present invention is to provide a power plug for an electronic device that permits installation of the power plug only to the intended device.

Another object of the present invention is to provide a power plug whose presence is easily sensed by an electronic device when installed.

Briefly stated, a power supply unit for an electronic device includes a power plug and an interconnection between the poser plug and the device. A power plug for an AC-DC adapter fits into a battery compartment of an electronic device instead of into a separate jack. The power supply unit includes an elastic cover that ensures a positive connection between the device and the power plug to prevent accidental disengagement of the power plug from the device. The power plug and battery compartment are configured so that an incorrect power plug cannot be connected by mistake. The configuration preferably includes a switch to signal the device that an AC-DC adapter is installed.

According to an embodiment of the invention, a power supply unit for an electronic device having a battery compartment for containing a battery, includes a switch, said switch avoiding contact with said battery contained in said battery compartment, and an adapter plug having a protrusion that contacts with and actuates said switch when said adapter plug is housed in said battery compartment.

According to an embodiment of the invention, a power supply unit for an electronic device having a battery compartment for containing a battery, includes a cover effective for permitting access to said battery compartment when in an open position and effective for denying access to said battery compartment when in a closed position, and an adapter plug having a catching portion effective for catching said cover when said cover is in said closed position and said adapter plug is installed in said battery compartment.

According to an embodiment of the invention, a power supply unit for an electronic device having a battery compartment effective for containing a battery includes an adapter plug shaped having positive and negative terminals shaped and positioned similarly to corresponding positive and negative contact terminals in said battery compartment, means in said adapter plug and said battery compartment so that said adapter plug fits into said battery compartment only one way, means, effective only when said adapter plug is fitted into said battery compartment, for signaling a presence of said adapter plug in said battery compartment, a cover, hingeably attached to said device, effective for covering said battery compartment and securing its contents, and said cover including means for securing said adapter plug to said device.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
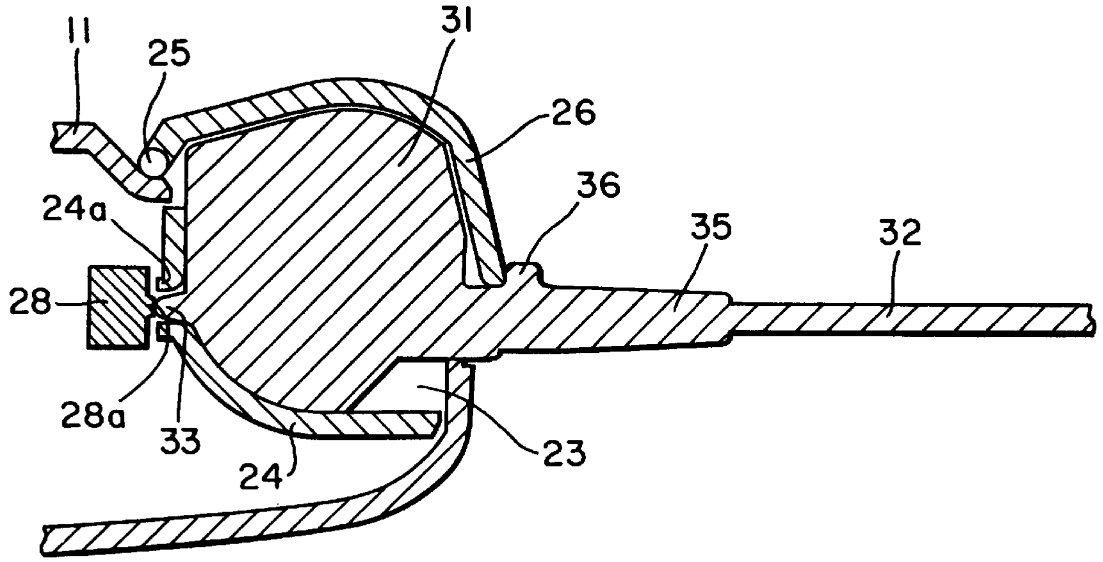
FIG. 1 is a sectional view of a power supply unit for an electronic device according to an embodiment of the present invention in the state where a cover is closed with an adapter plug connected.
Figure 2:
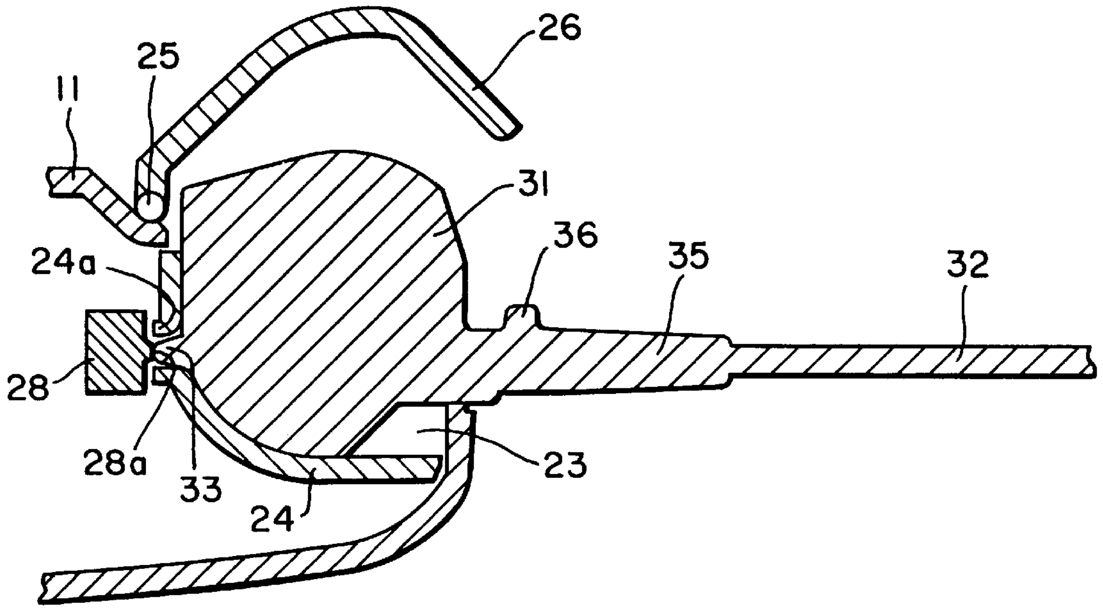
FIG. 2 is a sectional view of same in the state where the cover is fully open with the adapter plug connected.
Figure 3:
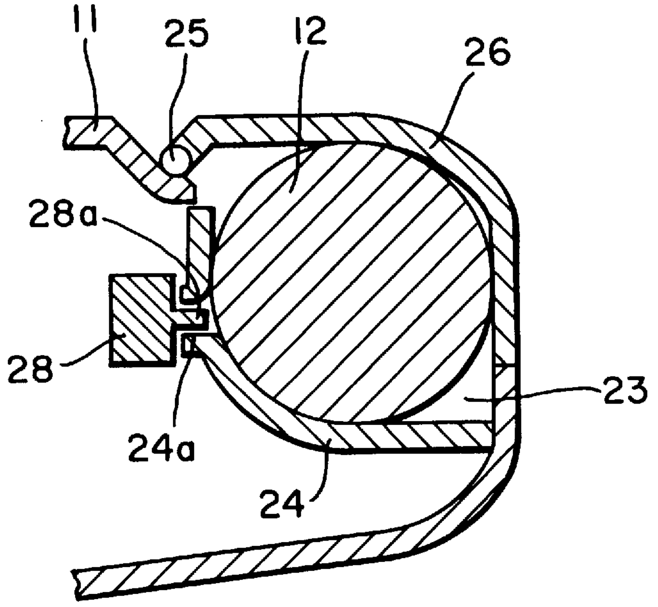
FIG. 3 is a sectional view of same in the state where a battery is installed.

Referring to FIGS. 1–3, a battery compartment 23 of an electronic device, such as a camera 11, includes a partition wall 24 which separates battery compartment 23 from the interior of the body of camera 11. Battery compartment 23 also includes a cover 26, which opens and closes on a hinge 25. Battery compartment 23 permits installation of a battery 12. Cover 26 can completely close with battery 12 inside battery compartment 23, thereby shielding battery 12 from the outside of the camera.

A switch 28 is located just outside battery compartment 23 so that an operating element 28*a* of switch 28 does not make contact with battery 12. A plug 31 includes a protrusion 33 which, when plug 31 is properly inserted into battery compartment 23, fits into a hole 24*a* of partition wall 24. When protrusion 33 fits into hole 24*a*, protrusion 33 makes contact with operating element 28*a* of switch 28 to signal the device that adapted AC to DC power is being used. Hole 24*a* and protrusion 33 are preferably located at different positions depending on the current and voltage characteristics of the DC power required by the electronic device.

Battery 12 is typically installed in battery compartment 23 to supply electric power when camera 11 is used outdoors. Positive and negative terminals 12*a*, 12*b* of battery 12 (shown in FIG. 4) correspond to positive and negative contact terminals (not shown) of battery compartment 23. When electronic camera 11 is used indoors, an AC adapter (not shown) powers camera 11 without fear of draining battery 12. Power to camera 11 is then supplied from the AC adapter to plug 31 through a power line 32. Positive and negative terminals 31*a*, 31*b* (shown in FIG. 6) of plug 31 correspond in location to terminals 12*a*, 12*b* of battery 12 so that proper contact is made with the contact terminals of battery compartment 23.

The configuration as above prevents plug 31 from being installed in battery compartment 23 upside down. The configuration also ensures that a plug having different power specifications and intended for a different device is not mounted by mistake.

When plug 31 is installed in battery compartment 23, cover 26 does not close all the way due to a connector portion 35 of plug 31 which connects to power line 32. A catching portion 36 protrudes from an outer surface of connector portion 35 to keep cover 26 in place. An elastic material, such as resin or spring metal, is preferably used to form cover 26 so that an end of cover 26 elastically deforms against catching portion 36. Thus, by latching cover 26 into catching portion 36, plug 31 is prevented from disengaging from battery compartment 23.

When using camera 11 outdoors, battery 12 is placed in battery compartment 23 so that electric power is supplied from battery 12. When using camera 11 indoors, cover 26 is opened and battery 12 removed. Then plug 31 of the AC-DC adapter is inserted into battery compartment 23. Electric power from the AC-DC adapter is supplied from terminals of plug 31, which are provided at the locations respectively corresponding to the terminals of battery 12, through the battery terminals (not shown) of battery compartment 23 to electronic camera 11. Thus, according to the invention, there is no need to provide a jack for an AC adapter so that the body of electronic camera 11 is reduced in size.

Hole 24*a* in battery compartment 23 and protrusion 33 of plug 31 are preferably positioned eccentrically with respect to plug 31 so that plug 31 is not installed upside down in battery compartment 23. Proper polarity of plug 31 with the contact terminals of battery compartment 23 is thus ensured. In addition, forming hole 24*a* and corresponding protrusion 33 at unique positions for each different type of device prevents the danger of mistakenly connecting plug 31 to the wrong device. Thus, the invention is effective in preventing any trouble that may otherwise be caused by improper installation.

The eccentricity of protrusion 33, hole 24*a*, and switch 28 is not limited to one direction. They may be positioned, for example, towards the front or rear of electronic camera 11 as well as up or down the length of battery compartment 23. In other words, they may be formed at any location as long as protrusion 33 protrudes through hole 24*a* and comes into contact with switch 28 only when plug 31 is properly installed.

Figure 4:
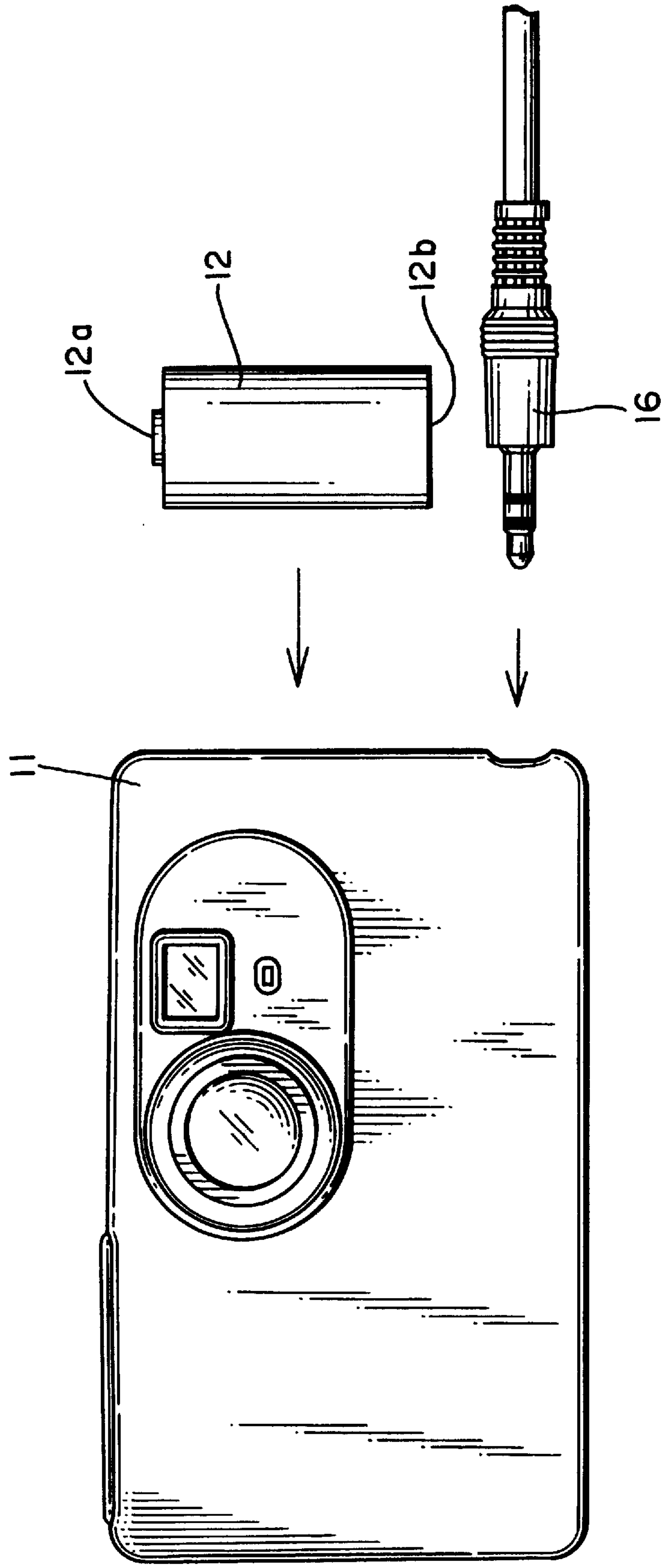
FIG. 4 is a front view of the device prior to installation of a battery.
Figure 5:
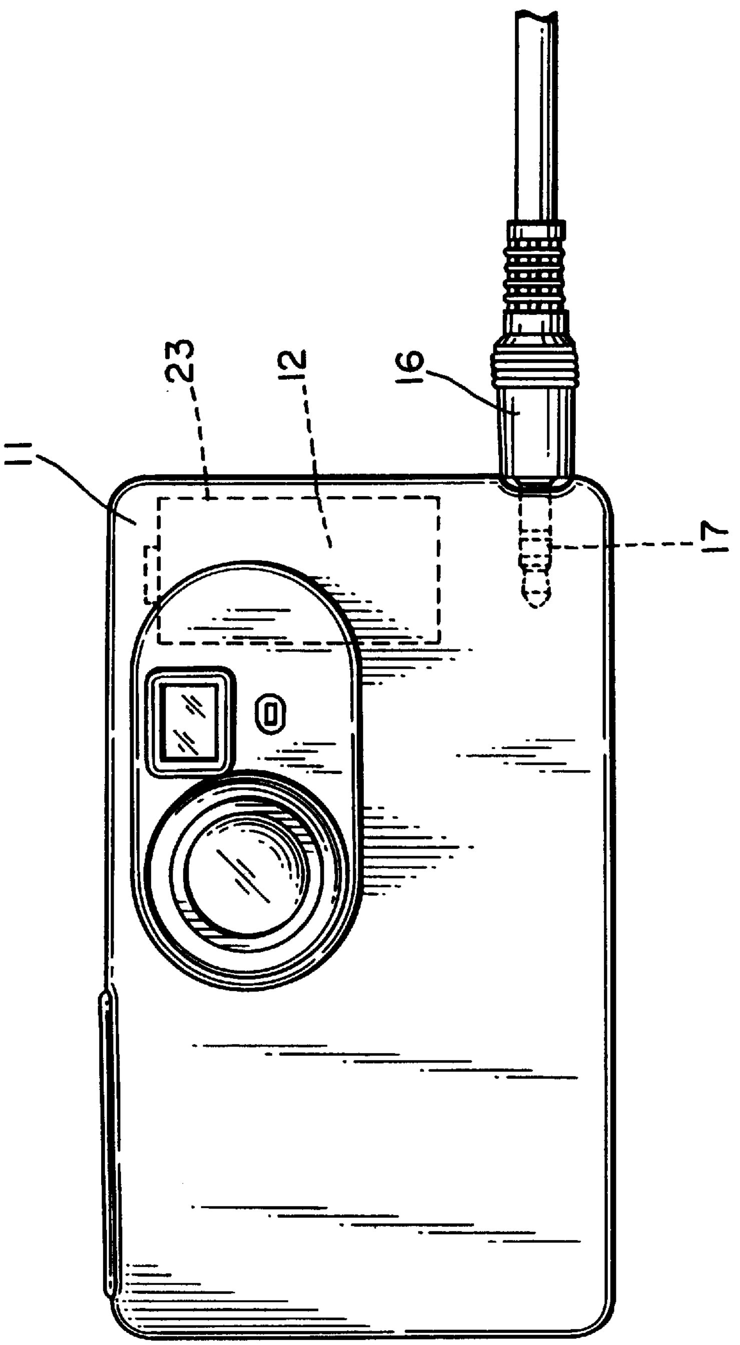
FIG. 5 is a front view of same with the battery installed.

Referring to FIGS. 4 and 5, camera 11 receives battery 12 into battery compartment 23 and communication plug 16 into jack 17. Since there is no jack for plug 14 as in the prior art, communication plug 16 can be inserted only in jack 17.

Figure 6:
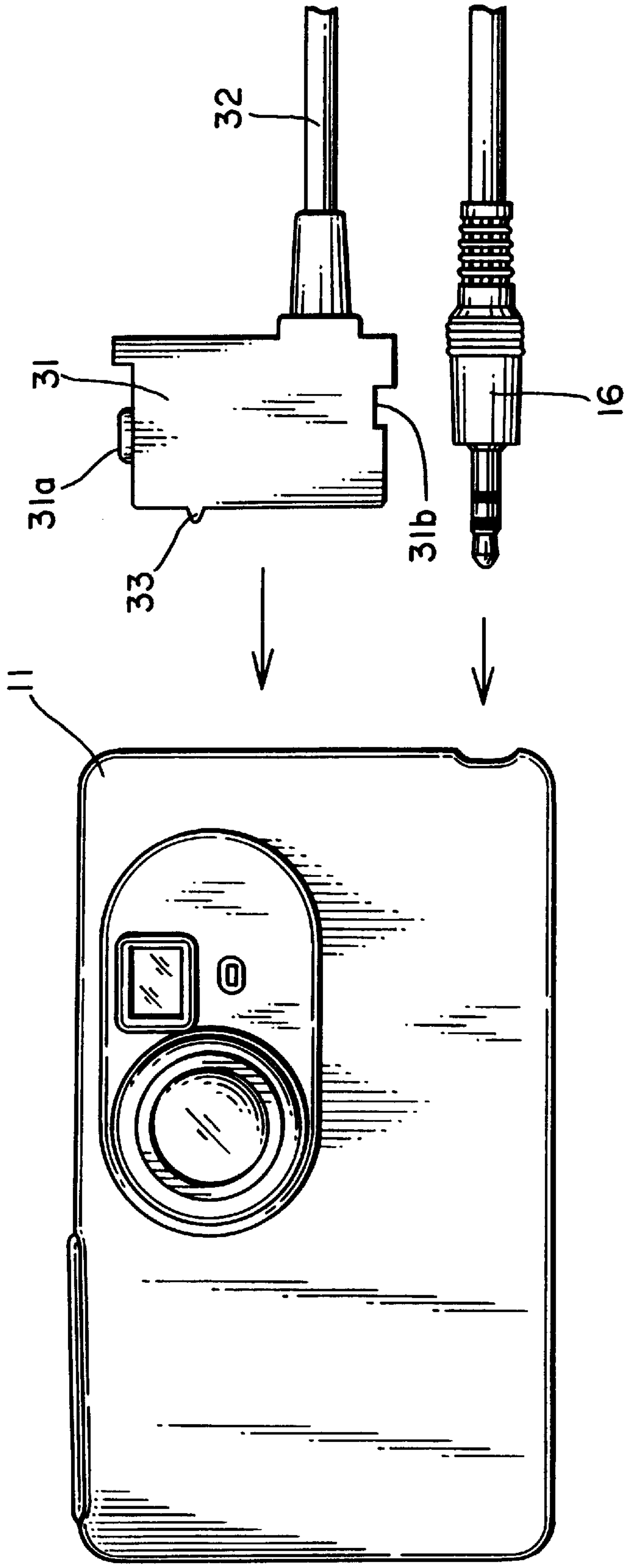
FIG. 6 is a front view of same prior to connection of the adapter plug.
Figure 7:
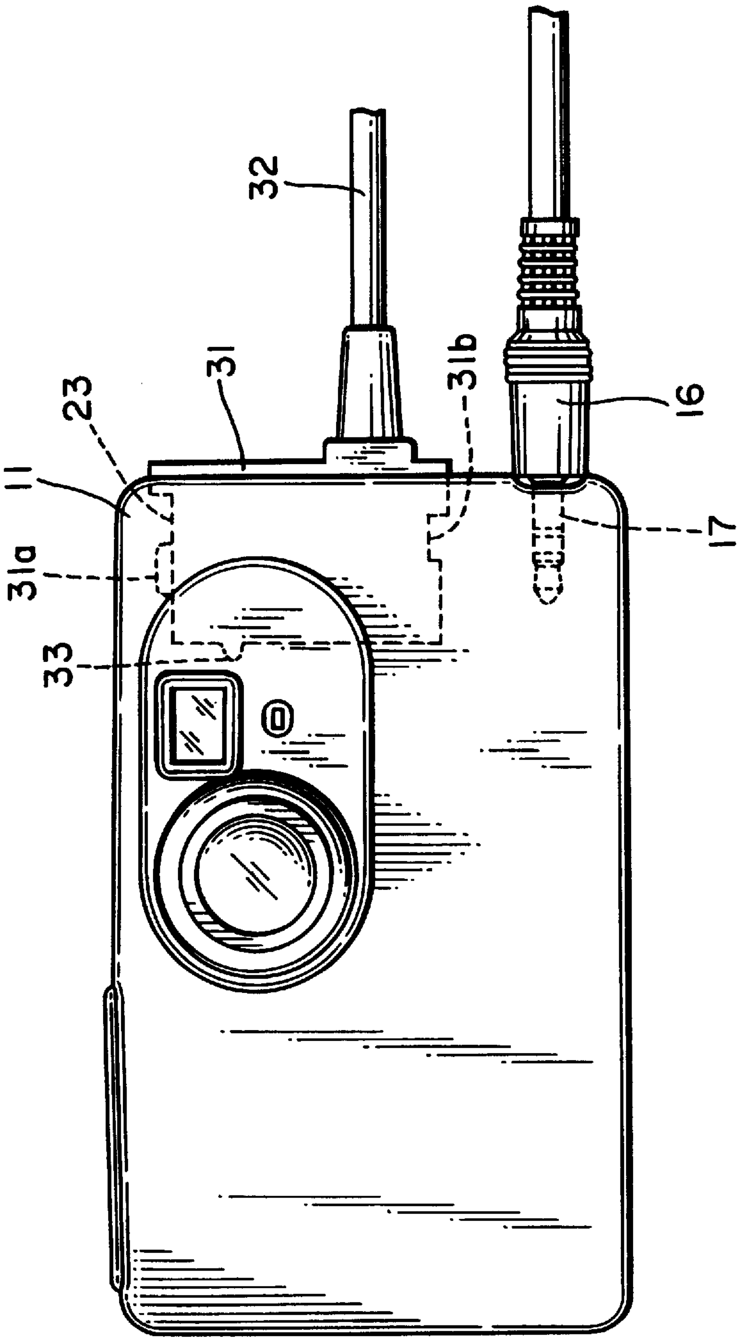
FIG. 7 is a front view of same with the adapter plug connected.

Referring to FIGS. 6 and 7, battery compartment 23 is shaped to receive plug 31 only if protrusion 33 is properly aligned. The completed installation of FIG. 7 shows plug 31 installed in battery compartment 23 with positive and negative terminals 31*a*, 31*b* in their proper location. As previously stated, protrusion 33 ensures proper alignment of plug 31 within battery compartment 23. Power line 32 connects plug 31 with the AC-DC adapter (not shown). Communication plug 16 is engaged with jack 17.

Figure 8:
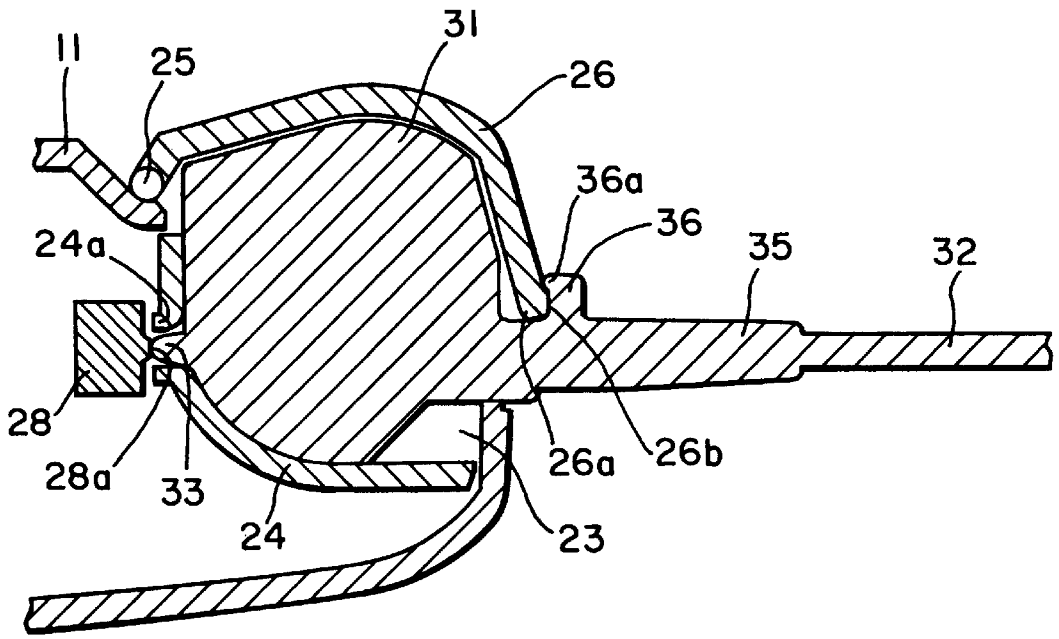
FIG. 8 is a sectional view of a power supply unit for an electronic device according to another embodiment of the present invention in the state where a cover is closed with an adapter plug connected.
Figure 9:
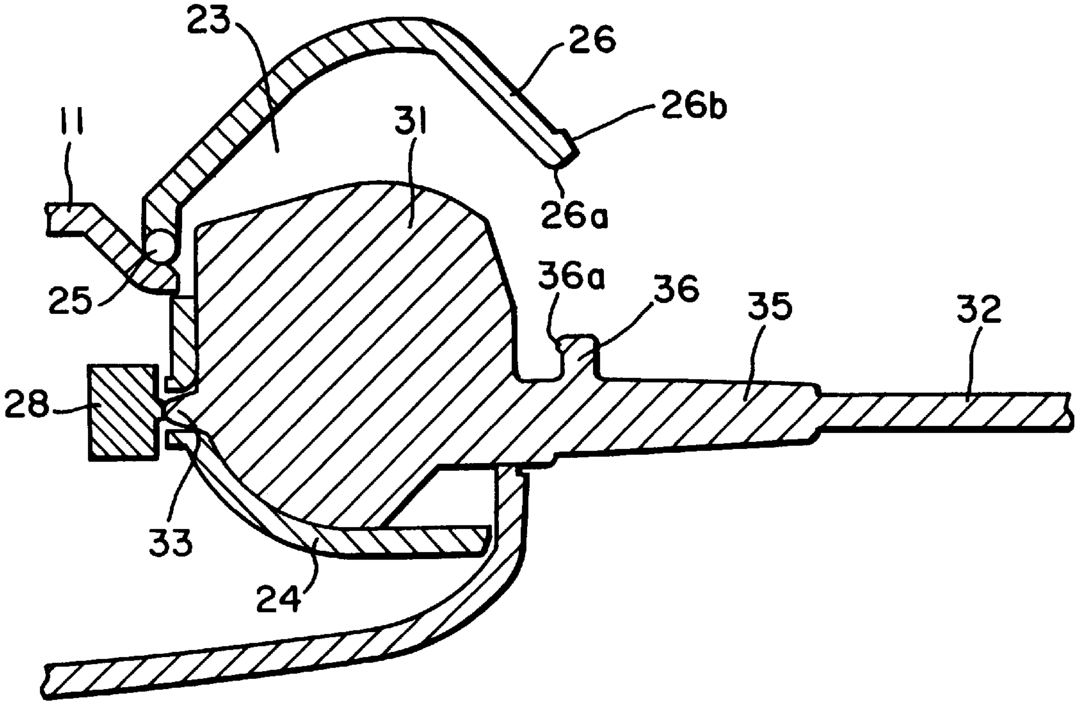
FIG. 9 is a sectional view of same in the state where the cover is fully open with the adapter plug connected.
Figure 10:
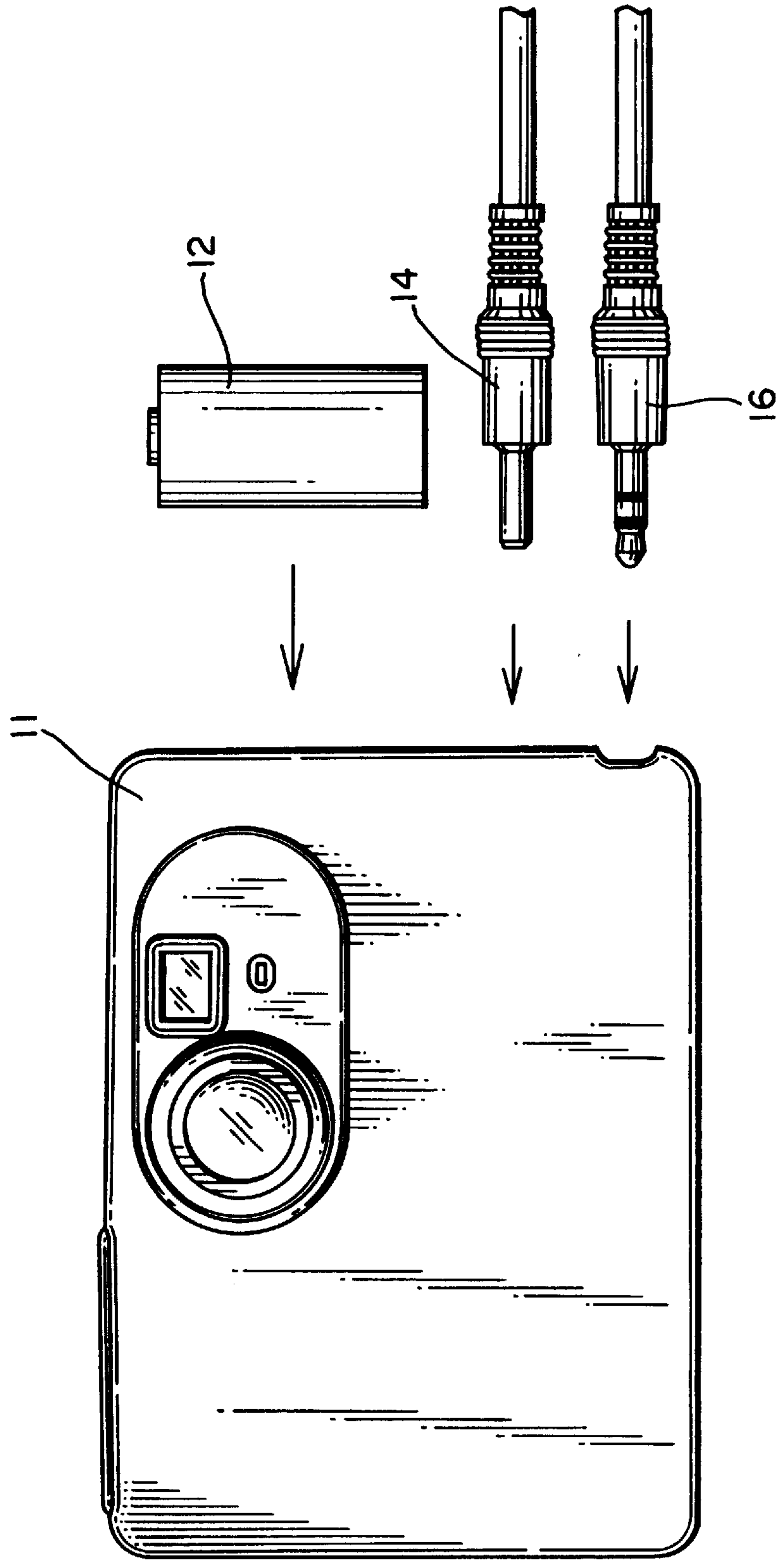
FIG. 10 PRIOR ART
FIG. 10 is a front view of an example of the conventional power supply unit for an electronic device prior to installation of a battery and a plug.
Figure 11:
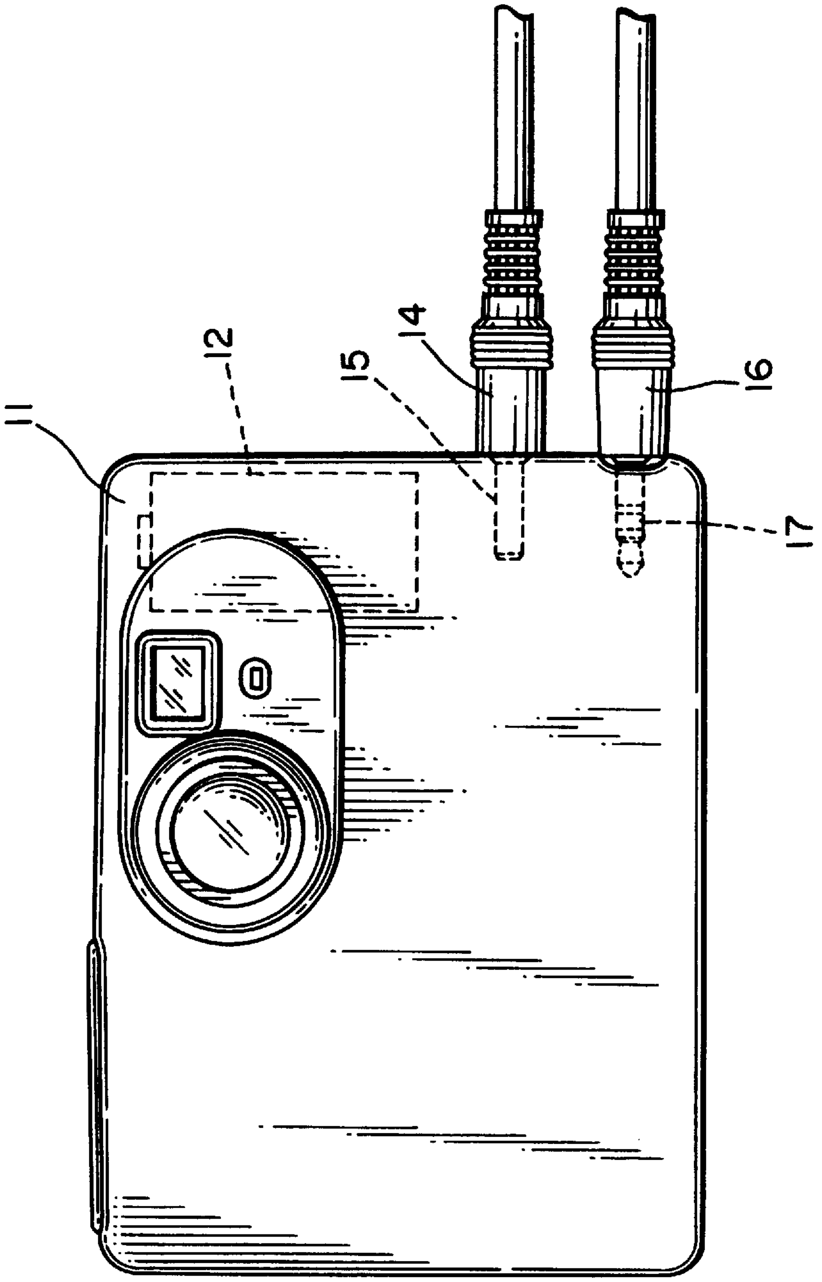
FIG. 11 PRIOR ART
FIG. 11 is a front view of same with the battery and the plug installed.

Referring to FIGS. 8 and 9, an alternative embodiment is shown which improves the latching of cover 26 with catching portion 36. An inner corner 26*a* of the end of cover 26 is chamfered as shown. An outer corner 26*b* of the end of cover 26 protrudes slightly to engage with an inner corner 36*a* of catching portion 36. The chamfered inner corner 26*a* permits the end of cover 26 to pass catching portion 36 with a small amount of force deforming cover 26 while latching cover 26. After cover 26 is closed and released, the elastic force of cover 26 presses outer corner 26*b* against catching portion 36 and inner corner 36*a*.

Although the invention is explained with reference to a camera as an example of electronic devices, this invention is not limited to a camera but is applicable to any electronic device which uses a battery.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A power supply unit for an electronic device having a battery compartment for containing a battery, comprising:

a switch;

said switch avoiding contact with said battery contained in said battery compartment; and an adapter plug having a protrusion that contacts with and actuates said switch when said adapter plug is housed in said battery compartment.

2. A unit according to claim 1, wherein, when said adapter plug is housed in said battery compartment, said protrusion contacts said switch through a hole in said battery compartment.

3. A unit according to claim 2, wherein a location of said hole is uniquely different for each different type of electronic device.

4. A unit according to claim 1, further comprising means, effective when said switch is actuated by said adapter plug, for signaling said device that said adapter plug is housed in said battery compartment.

5. A unit according to claim 1, further comprising:

a cover effective for permitting access to said battery compartment when in an open position and effective for denying access to said battery compartment when in a closed position; and said adapter plug having a catching portion effective for catching said cover when said cover is in said closed position and said adapter plug is installed in said battery compartment.

6. A unit according to claim 5, in switch said cover is an elastic material.

7. A unit according to claim 5, wherein an end of said cover includes an outer corner which engages with an inner corner of said catching portion when said cover is in said closed position.

8. A power supply unit for an electronic device having a battery compartment for containing a battery, comprising:

a cover effective for permitting access to said battery compartment when in an open position and effective for denying access to said battery compartment when in a closed position; and an adapter plug having a catching portion effective for catching said cover when said cover is in said closed position and said adapter plug is installed in said battery compartment.

9. A power supply unit for an electronic device having a battery compartment effective for containing a battery, comprising:

an adapter plug shaped having positive and negative terminals shaped and positioned similarly to corresponding positive and negative contact terminals in said battery compartment;

means in said adapter plug and said battery compartment so that said adapter plug fits into said battery compartment only one way;

means, effective only when said adapter plug is fitted into said battery compartment, for signaling a presence of said adapter plug in said battery compartment;

a cover, hingeably attached to said device, effective for covering said battery compartment and securing its contents; and said cover including means for securing said adapter plug to said device.

* * * * *